(12) United States Patent
Trowbridge et al.

(10) Patent No.: US 8,752,854 B2
(45) Date of Patent: Jun. 17, 2014

(54) GOOSENECK TRAILER WITH COUPLING LINK AND LATCH ACTUATORS

(75) Inventors: David Lee Trowbridge, Wilton, CA (US); Douglas Glen Murray, Lodi, CA (US)

(73) Assignee: Harley Murray, Inc., Stockton, CA (US)

( * ) Notice: Subject to any disclaimer, the term of this patent is extended or adjusted under 35 U.S.C. 154(b) by 700 days.

(21) Appl. No.: 12/874,923

(22) Filed: Sep. 2, 2010

(65) Prior Publication Data

US 2012/0056406 A1    Mar. 8, 2012

(51) Int. Cl.
*B62D 53/06*      (2006.01)
(52) U.S. Cl.
CPC ................................. *B62D 53/065* (2013.01)
USPC ...................................................... 280/441.2
(58) Field of Classification Search
CPC ............................ B62D 53/065; B62D 53/061
USPC ........... 280/425.2, 441.2, 417.1, 491.1, 491.5
See application file for complete search history.

(56) References Cited

U.S. PATENT DOCUMENTS

| | | | | |
|---|---|---|---|---|
| 2,603,531 A * | 7/1952 | Gustafson | ...................... | 298/18 |
| 2,952,476 A * | 9/1960 | Brockman | ................ | 280/425.2 |
| 2,953,396 A * | 9/1960 | Meadows | ................... | 280/441.2 |
| 2,967,720 A * | 1/1961 | Smith et al. | ................ | 280/441.2 |
| 3,043,609 A * | 7/1962 | Talbert | ........................ | 280/441.2 |
| 3,326,572 A * | 6/1967 | Murray | ..................... | 280/441.2 |
| 3,536,340 A * | 10/1970 | Talbert | ....................... | 280/441.2 |
| 4,219,211 A * | 8/1980 | Sauers | ....................... | 280/441.2 |
| 4,390,192 A * | 6/1983 | Wagner | ..................... | 280/441.2 |
| 4,400,005 A * | 8/1983 | Losh | .......................... | 280/441.2 |
| 4,413,836 A * | 11/1983 | Losh | .......................... | 280/441.2 |
| 4,423,885 A * | 1/1984 | Camey et al. | ............. | 280/441.2 |
| 4,472,100 A * | 9/1984 | Wagner | ......................... | 414/481 |
| 5,451,069 A * | 9/1995 | Schueman | ................. | 280/149.2 |
| 5,833,253 A * | 11/1998 | Hess | .......................... | 280/149.2 |
| 6,378,887 B2 * | 4/2002 | Landoll et al. | ............. | 280/425.2 |
| 8,459,685 B2 * | 6/2013 | Wood et al. | ................ | 280/441.2 |
| 2012/0056407 A1 * | 3/2012 | Trowbridge et al. | ........ | 280/441.2 |

* cited by examiner

*Primary Examiner* — Tony Winner
(74) *Attorney, Agent, or Firm* — Edward S. Wright

(57) ABSTRACT

Trailer with a detachable gooseneck having a deck supported toward the rear by ground engaging wheels, mating surfaces on the gooseneck and the deck which abut against each other when the gooseneck is attached to the deck, coupling pins extending along spaced apart, parallel axes from the gooseneck and the deck on opposite sides of the abutting surfaces, a coupling link movable along the pin on the gooseneck between a first position in which the link engages the pin on the deck and a second position in which the link is disengaged from the pin on the deck, and an actuator for moving the coupling link between the first and second positions. A latch hook is rotatively mounted on the deck to the rear of the abutting surfaces for engagement with a laterally extending latch bar which depends from the gooseneck, and a pneumatic actuator is operatively connected to the latch hook for moving the latch hook into and out of engagement with the latch bar.

21 Claims, 5 Drawing Sheets

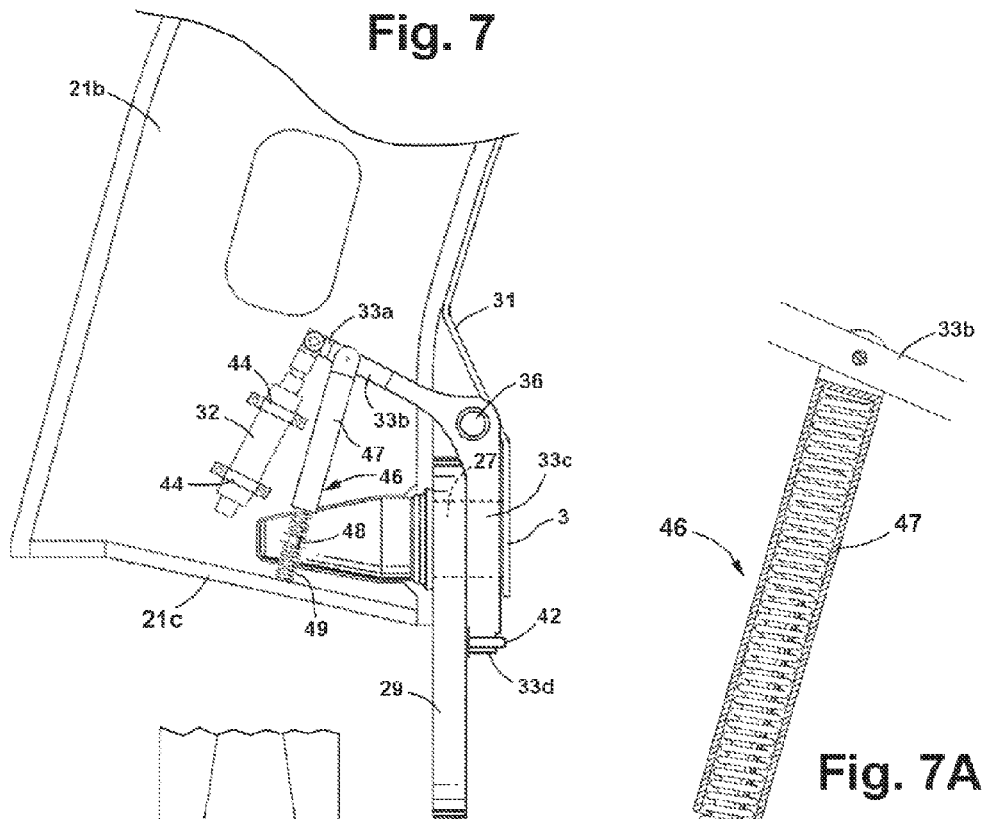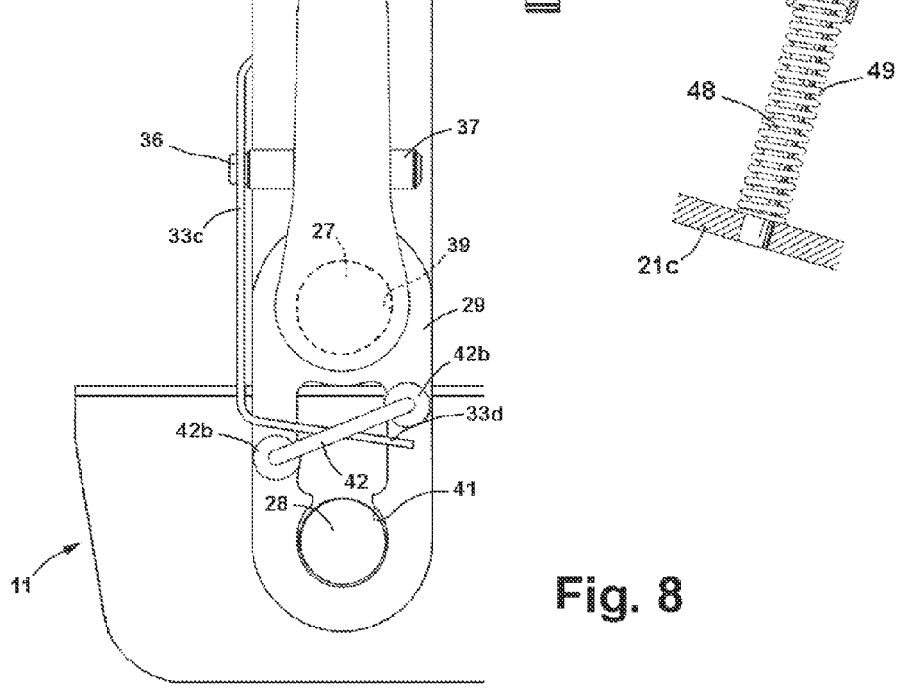

US 8,752,854 B2

GOOSENECK TRAILER WITH COUPLING LINK AND LATCH ACTUATORS

BACKGROUND OF THE INVENTION

1. Field of Invention

This invention pertains generally to trailers for carrying large, heavy loads and, more particularly, to a gooseneck trailer having actuators for engaging and disengaging the coupling links that secure the gooseneck and trailer deck together and for operating a latch mechanism that provides longitudinal coupling between the gooseneck and deck.

2. Related Art

Trailers for transporting construction equipment and other large, heavy loads typically have elongated decks supported toward the rear by ground engaging wheels, with means toward the fronts of the decks for connecting the trailers to tractors or other pulling vehicles. In some instances, the connection is made with a gooseneck which can be detached from the deck to allow the equipment to be loaded onto the deck from the front. One example of a trailer with a detachable gooseneck is found in U.S. Pat. No. 3,326,572.

The gooseneck and deck of a gooseneck trailer typically have inclined surfaces which mate together when the gooseneck is attached to the deck, with coupling links encircling pins on the gooseneck and deck to hold the surfaces together in load supporting relationship. Longitudinal coupling is provided by a latch mechanism on the trailer deck which engages laterally extending coupling lugs which depend from the gooseneck toward the rearmost end of the mating surfaces. The coupling links and latch mechanism are commonly operated by hand which requires the driver or other personnel to manually move the coupling links and engage or disengage the latch mechanism each time the gooseneck is attached to or detached from the deck of the trailer.

OBJECTS AND SUMMARY OF THE INVENTION

It is, in general, an object of the invention to provide a new and improved gooseneck trailer.

Another object of the invention is to provide a trailer of the above character with an actuator for engaging and disengaging the coupling links that secure the gooseneck and trailer deck together.

Another object of the invention is to provide a trailer of the above character with an actuator for engaging and disengaging a latch mechanism that provides longitudinal coupling and stability between the gooseneck and trailer deck.

These and other objects are achieved in accordance with the invention by providing a gooseneck trailer comprising a deck, a gooseneck, coupling pins extending along spaced apart, parallel axes from the gooseneck and the deck, a coupling link movable along the axes between a first position in which the link engages the pins on both the gooseneck and the deck and a second position in which the link engages only one of the pins and is disengaged from the other, a latch mechanism engagable between the gooseneck and the deck, and actuators for moving the link between the first and second positions and the latch mechanism between engaged and disengaged positions.

BRIEF DESCRIPTION OF THE DRAWINGS

FIG. 7 is a fragmentary side elevational view of a gooseneck having another embodiment of a coupling link operator according to the invention.

FIG. 7A is an enlarged vertical sectional view of a spring assembly in the embodiment of FIG. 7.

FIG. 8 is a fragmentary front elevational view, partly broken away, of the embodiment of FIG. 5.

DETAILED DESCRIPTION

Figure 1:
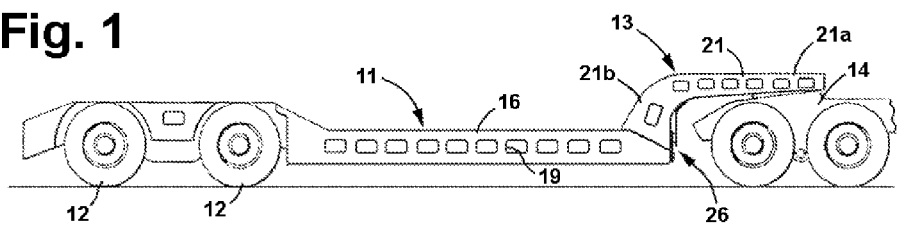
FIG. 1 is a side elevational view of one embodiment of a gooseneck trailer with a coupling link operator according to the invention.

As illustrated in FIG. 1, the trailer includes an elongated deck 11 supported at the rear by ground engaging wheels 12, with a gooseneck 13 at the front end of the deck for connection to the fifth wheel of a tractor or other suitable pulling vehicle 14.

The deck has longitudinally extending frame members or beams 16 on opposite sides thereof, with cross members 17 extending transversely between the frame members, and decking 18 supported by the cross members. Frame members 16 are typically I-beams, cross members 17 are typically I-beams or C-shaped channel members, and the decking is typically wood. Cutouts 19 are formed in the web portions of the I-beams and cross members to reduce the weight of the trailer. Alternatively, if desired, the decking can be made of materials other than wood or omitted entirely, and other load carrying structures such as rails for receiving flanged wheels of railroad equipment can also be mounted to the cross members.

The gooseneck has a pair of I-beams 21 which align with frame members 16 when the gooseneck is attached to the deck. The gooseneck beams are in the shape of a goose's neck, with horizontally extending front portions 21a and vertically extending rear portions 21b joined together in a smooth continuous curve. The lower surfaces 22 of the rear portions of the gooseneck beams and the upper surfaces 23 of the front portions of the frame members of the deck are inclined downwardly and forwardly to form mating surfaces which abut against each other, with the flanges on the front sides of the upright portions of the gooseneck aligned with the front ends of the deck beams, when the gooseneck is attached to the deck.

The gooseneck and deck are connected together in load supporting relationship by coupling assemblies 26 which include coupling pins 27, 28 and a link 29. Pins 28 extend longitudinally from the forward ends of deck beams 16, and pins 27 extend from the front flanges of the upright portions of gooseneck beams 21 along axes spaced from and parallel to the axes of pins 28. The gooseneck pins are longer than the deck pins, and the front ends of the gooseneck pins are supported by straps 31 affixed to the front sides of the vertical portions 21b of the gooseneck beams.

Figure 2:
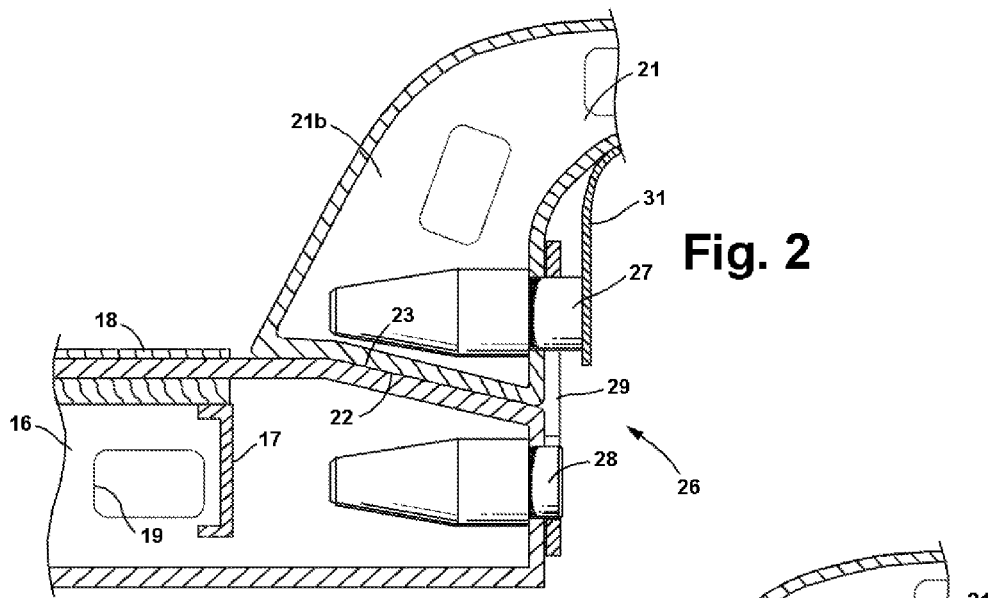
FIG. 2 is a fragmentary vertical sectional view of the coupling between the gooseneck and the trailer deck in the embodiment of FIG. 1, with the coupling link in its locking position in engagement with the coupling pins on both the gooseneck and the deck.
Figure 3:
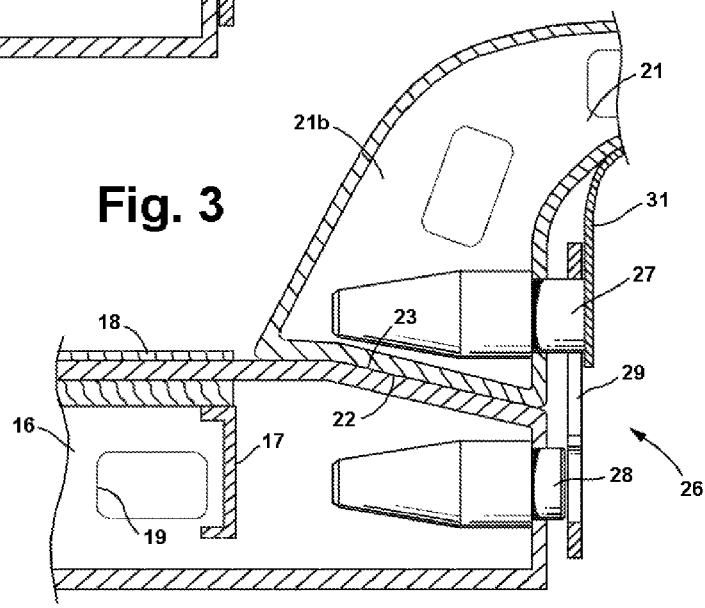
FIG. 3 is a fragmentary vertical sectional view similar to FIG. 2, with the coupling link disengaged from the coupling pin on the deck.

Links 29 are slidably mounted on the gooseneck pins for movement between forward and aft positions relative to the pins. In the aft position, shown in FIG. 2, the links encircle both the gooseneck pins 27 and the deck pins 28 and lock the abutting surfaces of the beams rigidly together, thereby connecting the gooseneck to the deck. In the forward position, shown in FIG. 3, the links hang from the gooseneck pins, disengaged from the deck pins, and the gooseneck is disconnected from the deck.

Figure 4:
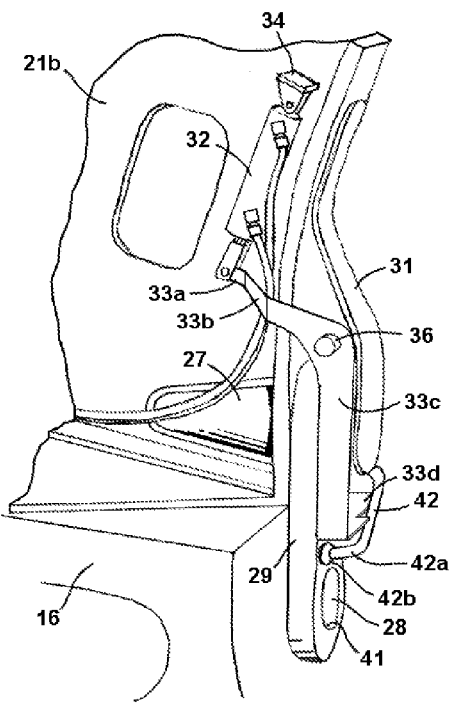
FIG. 4 is a fragmentary isometric view of one embodiment of a coupling link operator utilized in the embodiment of FIG. 1.
Figure 5:
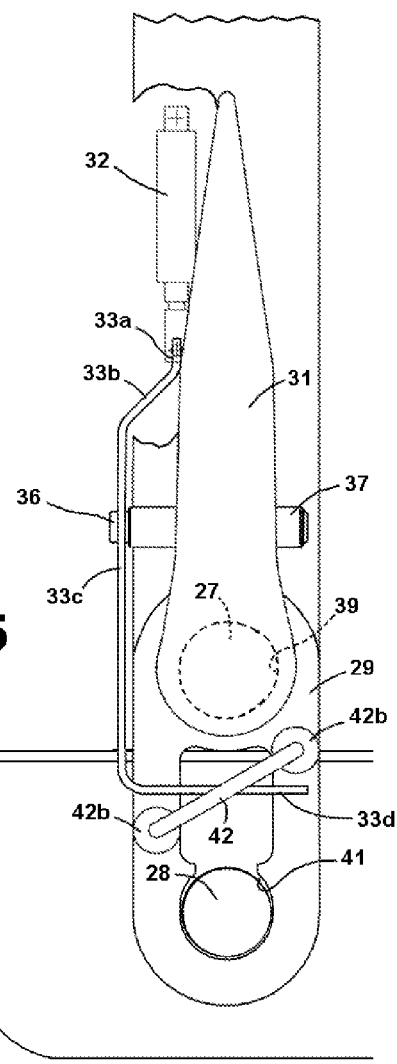
FIG. 5 is a fragmentary front elevational view, partly broken away, of the embodiment of FIG. 4.

As illustrated in FIG. 4, the coupling assemblies also include an actuators 32 and lever arms 33 for moving the links between the forward and aft positions. In one presently preferred embodiment, the actuators are double acting pneumatic cylinders, although other types of actuators such as hydraulic cylinders or electrically operated solenoids can be utilized, if desired. One end of the cylinder is pivotally connected to a mounting bracket 34 on the web portion of gooseneck beam 21, and the other end of the cylinder is pivotally connected to the inner end portion of lever arm 33, with the cylinder positioned generally above the arm.

The lever arm has an inner section 33a which extends in a direction generally parallel to the axes of coupling pins 27, 28, an intermediate section 33b which extends outwardly away from the web of I-beam 21 at an angle of 45 degrees, an L-shaped section 33c which extends past the I-beam flange in a direction parallel to the web and extends vertically on the outer side of the I-beam, and a horizontal section 33d which extends from the lower end of the L-shaped section in a direction generally perpendicular to the axes of the coupling pins. The arm is mounted on a shaft 36 which is journalled in a bearing 37 mounted on the inner side of support strap 31 for rotation about an axis perpendicular to the axes of the coupling pins.

Coupling link 29 has a thick planar body with an upper opening 39 in which coupling pin 27 is received in sliding relationship and a lower opening or socket 41 in which coupling pin 28 is received when the link is in the aft position and the gooseneck is attached to the deck. The link also has a bar 42 which is spaced from the outer surface of the body, with the outer section 33d of operating arm 33 passing between the body and the bar and the inner surface of the bar serving as a bearing surface for the arm. In the embodiment illustrated, the bar is generally U-shaped, with legs 42a terminating in mounting pads 42b affixed to the outer surface of the body.

When the gooseneck is attached to the deck, the coupling links are in the aft position and engage the coupling pins on the deck as well as the pins on the gooseneck. To disconnect the gooseneck from the deck, cylinders 32 are actuated to push down on the inner end portions of lever arms 33, thereby rotating the arms about their pivot axes and swinging the outer end portions 33d of the arms in an outward or forward direction toward link bars 42. As the arms bear against the bars, the links move to the forward position in which they are disengaged from the coupling pins on the deck.

Figure 6:
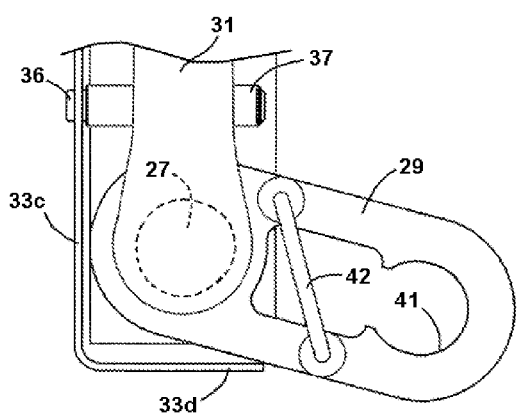
FIG. 6 is a view similar to FIG. 5 with the coupling link in a rest position.
Figure 9:
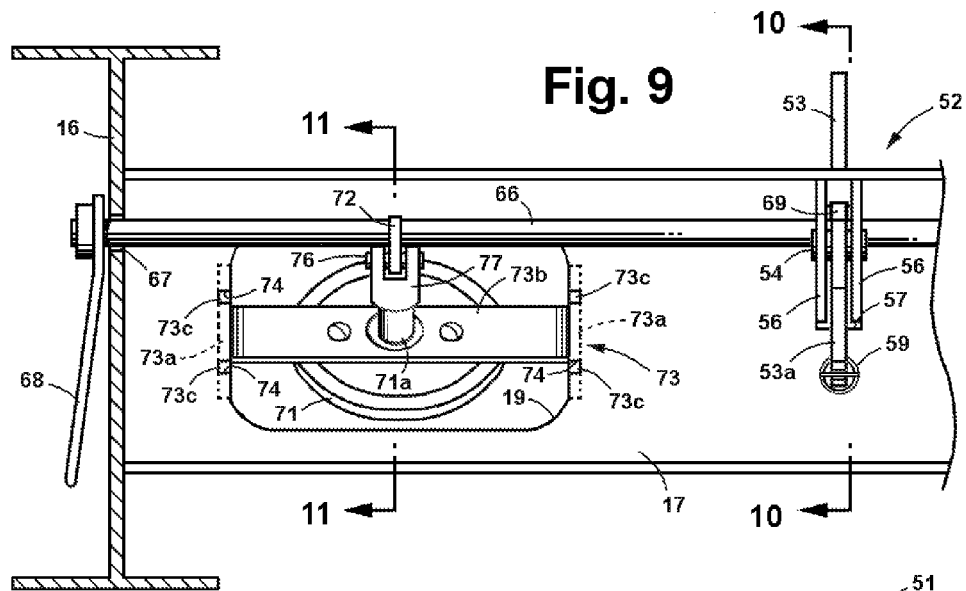
FIG. 9 is a fragmentary vertical sectional view of one embodiment of a T-bar latch assembly in the embodiment of FIG. 1.

With the links disengaged from the pins on the deck, they can be manually rotated about the pins on the gooseneck and positioned to one side, resting on the outer end portions 33d of the lever arms, as shown in FIG. 6, rather than hanging down where they could be damaged.

To attach the gooseneck to the deck, the mating surfaces 22, 23 of the gooseneck and deck are brought together, the coupling links are returned to their down positions, and the operating cylinders are actuated to pull up on the inner end portions of the lever arms, thereby rotating the arms and swinging their outer end portions toward the bodies of the coupling links. With the arms moving in this direction, they bear against the outer surfaces of the links and move the links to the aft position into engagement with the pins on the deck.

The embodiment shown in FIG. 7 is generally similar to the embodiment of FIG. 4, and like reference numerals designate corresponding elements. In this embodiment, operating cylinder 32 is positioned below the inner end portion of lever arm 33 and is attached to the web of I-beam 21 by clamps 44. Thus, the cylinder pulls down on the inner end portion of the arm to swing the outer end portion of the arm in an outward direction and move the coupling link out of engagement with the pin on the deck.

The embodiment of FIGS. 7-7A also includes means for urging the coupling link toward the aft or coupling position. In the embodiment shown, this means comprises a spring assembly 46 which has an elongated cylindrical housing 47 that is pivotally connected to the intermediate section 33b of the lever arm. The assembly also includes a guide post 48 which extends between a frame member 21c at the lower end of I-beam 21 and the lower portion of the housing in coaxial alignment with the housing. A compression spring 49 is disposed coaxially about the post and extends from the lower end of the post to the upper end of the housing. The spring bears against the frame member and the housing, pushing the inner end portion of the lever arm in an upward direction, thereby urging the outer end portion 33d of the arm toward the outer surface of the coupling link and urging the link toward the aft or coupling position.

In this embodiment, the actuator can be a single acting device since it only needs to move the coupling link in one direction. However, a double acting device can be utilized, if desired, to provide redundancy in moving the coupling link toward the coupling position.

Referring now to FIGS. 9-13, longitudinal coupling and stability are provided by T-bars 51 which depend from the rearmost ends of the mating surfaces 22 of the gooseneck beams and pass through openings (not shown) in the frame members 16 of the deck where they are releasably engaged by latch mechanisms 52.

Each of the T-bars has a vertically extending stem or post 51a and a crossbar 51b which extends laterally from the post for engagement by latch hooks 53. The latch hooks are rotatively mounted on pivot pins 54 between mounting brackets 56, 56 affixed to cross member 17 on opposite sides of the latch hooks. The forward portion of each of the latch hooks extends through a slotted opening 57 in the web portion of the cross member, with the mounting brackets being affixed by welding or other suitable means to the upper flange of the cross member and to the side walls of the opening.

Figure 10:
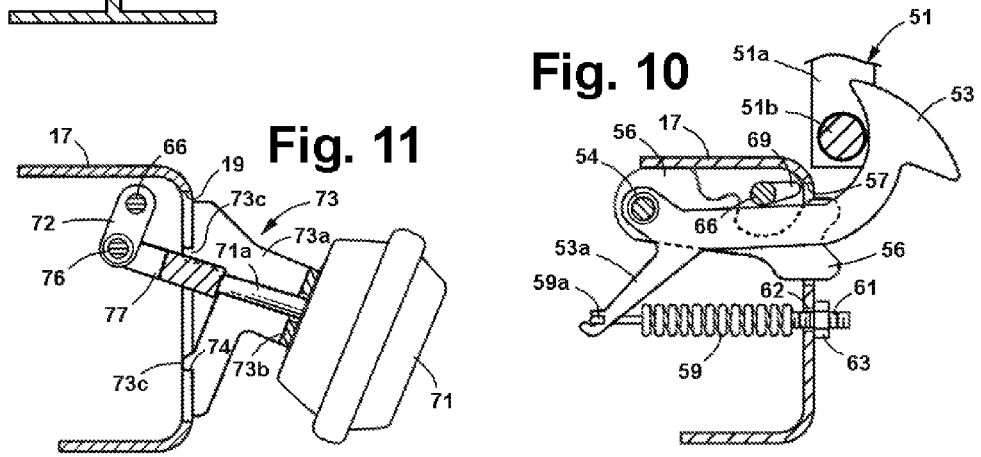
FIG. 10 is a cross sectional view taken along line 10-10 in FIG. 9.

Each of the latch hooks is urged toward its extended or engaged position shown in FIG. 10 by a spring 59 connected between the latch hook and the cross member of the deck. At one end, the spring has a hook 59a which is connected to an arm 53a of the latch hook, and at the other end, it is attached to a threaded rod or bolt 61 that extends through an opening 62 in the cross member, with a nut 63 bearing against the forward side of the cross member for adjusting the tension in the spring.

Figure 12:
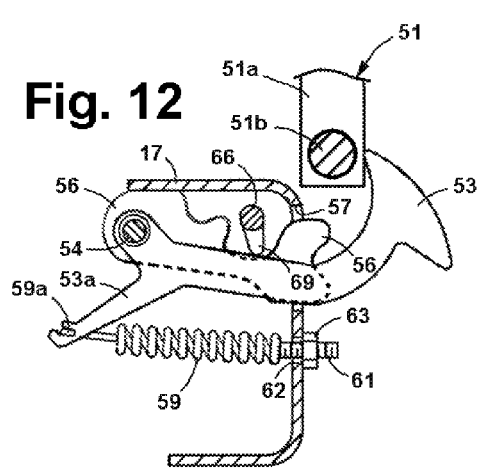
FIG. 12 is a view similar to FIG. 10 with the latch assembly in a different operational position.

The latch mechanism also includes an operating rod or shaft 66 which extends laterally of the deck section and is rotatively mounted in brackets 56, 56 on opposite sides of the latch hooks. The rod passes through an opening 67 in the web portion of I-beam 16, and an operating lever 68 is attached to the rod on the outer side of the I-beam. Cam lobes 69 are affixed to the operating rod in position to engage the upper surfaces of latch hooks 53 and drive the hooks toward a retracted position, as shown in FIG. 12 upon rotation of the rod.

A pneumatic actuator 71 is connected to the operating rod by a crank arm 72 for rotating the rod to move the latch hooks between their extended and retracted positions. The actuator is mounted on a bracket 73 which bridges one of the cutout openings 19 in cross member 17. This bracket is generally U-shaped with arms 73a, 73a at opposite ends of the opening and a base 73b which extends between arms at an angle on the order of 22.5 degrees to the front face of the cross member. Locating tabs 73c extend from the front edges of arms 73a and are received in notches 74 in the cross member. The bracket is affixed to the cross member by welding or other suitable means.

Crank arm 72 extends radially from rod 66 and is affixed to the rod by welding or other suitable means. The free end of the crank arm is pivotally connected the output shaft 71a of the actuator by a clevis pin 76 between the arms of a clevis fork 77 at the outer end of the shaft.

Figure 11:
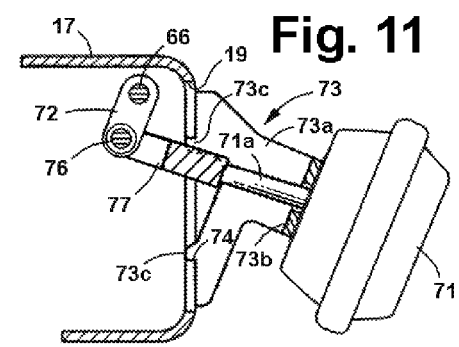
FIG. 11 is a cross sectional view taken along line 11-11 in FIG. 9.
Figure 13:
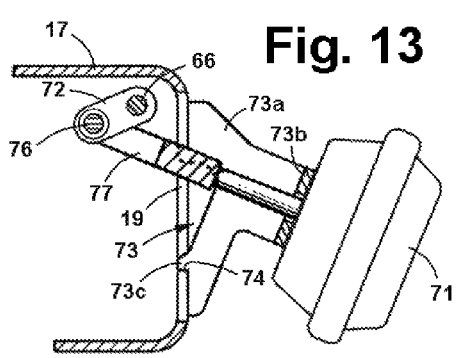
FIG. 13 is a view similar to FIG. 10 with the latch assembly in a different operational position.

In use, when operating rod 66 is turned so that cam lobes 69 are out of engagement with latch hooks 53, springs 59 urge the latch hooks toward the extended position shown in FIGS. 10 and 11, with the operating rod serving as a limiting abutment for the latch hooks in this position. The latch hooks are retracted by actuating pneumatic actuator 71 to turn crank arm 72 and thereby rotate the operating rod so that the cam lobes depress the latch hooks, as shown in FIGS. 12 and 13. In the event that it should become necessary, the action of the actuator and/or the return spring can be overridden manually by turning operating lever 68 to extend or retract the latch hooks.

It should also be noted that in this embodiment, the axis of pivot pins 54 is below the portions of the latch hooks which engage the T-bars. Thus, should the need arise, the latch hooks can also be disengaged from the T-bars by moving the gooseneck in a forward direction when it is otherwise detached from the trailer deck. With the pivot axis below the hooks, this movement will cause the free ends of the hooks to deflect in a downward direction until they are disengaged from the T-bars.

Figures 14, 15:
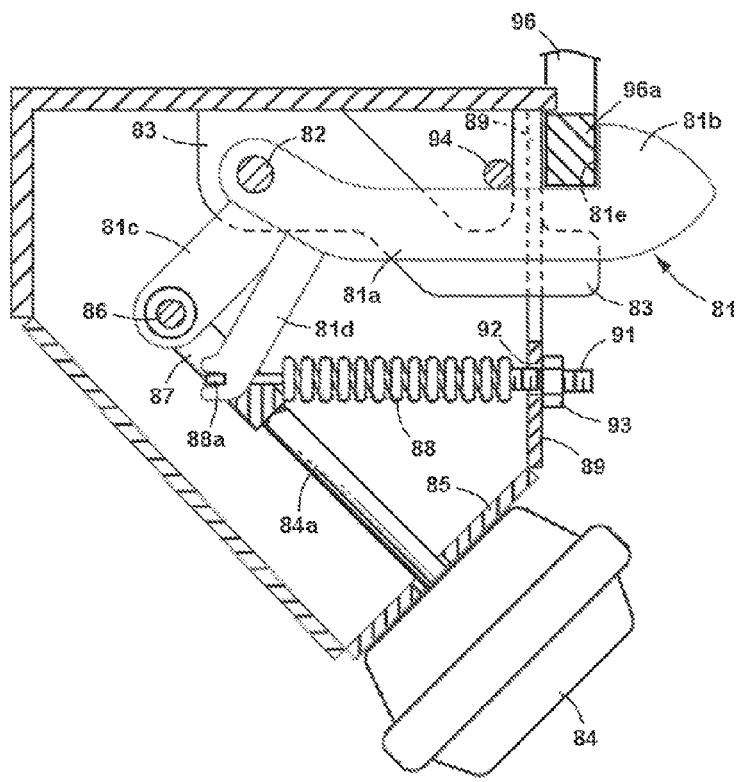
FIG. 14 is a vertical sectional view of another embodiment of a T-bar latch assembly for use in the embodiment of FIG. 1.
FIG. 15 is a view similar to FIG. 14 with the latch assembly in a different operational position.

In the embodiment of FIGS. 14-15, each of the latch hooks 81 has a body 81a with a hook 81b at one end and crank and spring arms 81c, 81d at the other. The body is affixed to a laterally extending shaft 82 which is rotatively mounted in brackets 83 affixed to the frame of the deck on opposite sides of the latch hook. The shaft extends through the web portion of I-beam 16 at the side of the deck, with an operating lever similar to lever 68 on the outer side of the I-beam.

A pneumatic actuator 84 is connected directly to each of the latch hooks. The actuator is mounted on a plate 85 affixed to the frame of the deck, with the output shaft 84a of the actuator being connected to crank arm 81c by a clevis pin 86 between the arms of a clevis fork 87 at the outer end of the shaft.

A return spring 88 is connected between spring arm 81d and a plate 89 affixed to mounting plate 85 and the frame of the deck. At one end, the spring has a hook 88a which is connected to the spring arm of the latch hook, and at the other end, it is attached to a threaded rod or bolt 91 that extends through an opening 92 in plate 89, with a nut 93 bearing against the outer side of the plate for adjusting the tension in the spring. A short bar 94 extends between and is affixed to mounting brackets 83 to provide a limiting abutment for the latch hook in its extended or engaged position.

This embodiment also differs from the embodiment of FIGS. 9-13 in that the crossbars 96a of T-bars 96 are generally rectangular in cross section, and latch hooks 81 have flat vertical faces 81e which engage the crossbars.

In use, return springs 88 urge latch hooks 81 toward the extended position shown in FIG. 14, with stop bars 94 serving as limiting abutments for the latch hooks in this position. The latch hooks are retracted by actuating pneumatic actuators 84 to rotate the hooks in a downward direction about the axes of shafts 82 to the retracted position shown in FIG. 15. As in the previous embodiment, the action of the actuator and/or the return spring can be overridden manually by means of the operating levers connected to the latch hooks via shafts 82.

The invention has a number of important features and advantages. It relieves the driver and other personnel from having to manually move the two coupling links and the T-bar latches each time the gooseneck is attached to or detached from the deck of the trailer, thereby saving time and reducing the cost of labor. Moreover, with the coupling links operated by an actuator, it is no longer necessary for someone to have his hands in close proximity to the moving parts of the coupling system where they could suffer serious injury in the event that something should go wrong.

It is apparent from the foregoing that a new and improved gooseneck trailer has been provided. While only certain presently preferred embodiments have been described in detail, as will be apparent to those familiar with the art, certain changes and modifications can be made without departing from the scope of the invention as defined by the following claims.

The invention claimed is:

1. A trailer with a detachable gooseneck, comprising a deck supported toward the rear by ground engaging wheels, mating surfaces on the gooseneck and the deck which abut against each other when the gooseneck is attached to the deck, coupling pins extending along spaced apart, parallel axes from the gooseneck and the deck on opposite sides of the abutting surfaces, a coupling link movable along the pin on the gooseneck between a first position in which the link engages the pin on the deck and a second position in which the link is disengaged from the pin on the deck, an operating arm engagable with the coupling link, an actuator mounted on the gooseneck and connected to the operating arm for moving the coupling link between the first and second positions, an elongated cylindrical housing connected to the operating arm, a guide post attached to the gooseneck and disposed coaxially of the housing, and a compression spring having a first portion disposed coaxially about the post and a second portion within the housing for urging the coupling link toward the first position.

2. A trailer with a detachable gooseneck, comprising a deck supported toward the rear by ground engaging wheels, mating surfaces on the gooseneck and the deck which abut against each other when the gooseneck is attached to the deck, coupling pins extending along spaced apart, parallel axes from the gooseneck and the deck on opposite sides of the abutting surfaces, a coupling link movable along the pin on the gooseneck between a first position in which the link engages the pin on the deck and a second position in which the link is disengaged from the pin on the deck, an operating arm engagable with the coupling link, and an actuator mounted on the gooseneck and connected to the operating arm for moving the coupling link between the first and second positions, wherein the coupling link can be rotated about the coupling pin on the gooseneck and positioned to one side, with the link resting on an outer end portion of the operating arm when the link is disengaged from the pin on the deck.

3. The trailer of claim 2 wherein the actuator is a pneumatic cylinder.

4. The trailer of claim 2 including means connected to the operating arm for resiliently urging the coupling link toward the first position.

5. A trailer with a detachable gooseneck, comprising a deck supported toward the rear by ground engaging wheels, mating surfaces on the gooseneck and the deck which abut against each other when the gooseneck is attached to the deck, coupling pins extending along spaced apart, parallel axes from the gooseneck and the deck on opposite sides of the abutting surfaces, a coupling link movable along the pin on the gooseneck between a first position in which the link engages the pin on the deck and a second position in which the link is disengaged from the pin on the deck, an operating arm engagable with the coupling link, and an actuator mounted on the gooseneck and connected to the operating arm for moving the coupling link between the first and second positions, the coupling link having a body with openings for the coupling pins and a bearing surface spaced from the body, with a portion of the operating arm passing between the body and the bearing surface.

6. The trailer of claim 5 wherein the mating surfaces are forwardly and downwardly inclined, and the coupling pins extend longitudinally of the gooseneck and deck.

7. The trailer of claim 5 wherein the operating arm is pivotally mounted on the gooseneck for movement about the pivot axis.

8. The trailer of claim 5 including a latch hook rotatively mounted on the deck to the rear of the abutting surfaces for engagement with a laterally extending latch bar which depends from the gooseneck, and a pneumatic actuator operatively connected to the latch hook for moving the latch hook into and out of engagement with the latch bar.

9. The trailer of claim 8 including a spring which resiliently urges the latch hook toward engagement with the latch bar.

10. The trailer of claim 8 including an operating lever operatively connected to the latch hook for manually moving the latch hook into and out of engagement with the latch bar.

11. The gooseneck trailer of claim 5 including means for resiliently urging the coupling link toward the first position.

12. The gooseneck trailer of claim 5 wherein the actuator is a pneumatic cylinder.

13. The trailer of claim 5 further including a laterally extending latch bar depending from the gooseneck near the rearmost ends of the abutting surfaces, a latch hook rotatively mounted on the deck for movement between an extended position in which the latch hook is engaged with the latch bar and a retracted position in which the latch hook is disengaged from the latch bar, a pneumatic actuator operatively connected to the latch hook for moving the latch hook between extended and retracted positions, and a spring connected to the latch hook for resiliently urging the latch hook toward the extended position.

14. The trailer of claim 13 including an operating rod rotatively mounted to the deck, a cam lobe affixed to the operating rod engagable with the latch hook for moving the latch hook toward the retracted position, and a crank arm affixed to the operating rod and pivotally connected to the pneumatic actuator for rotating the operating rod about its axis with the cam lobe pushing the latch hook toward the retracted position.

15. The trailer of claim 14 including an operating lever connected to the operating rod for manually rotating the operating rod to move the latch hook between the extended and retracted positions.

16. The trailer of claim 13 wherein the pneumatic actuator is connected to a crank arm affixed to the latch hook.

17. The trailer of claim 13 wherein the latch hook is affixed to a shaft which is rotatively mounted to the deck, with an operating lever affixed to the shaft for rotating the latch hook between the extended and retracted positions.

18. A trailer with a detachable gooseneck, comprising a deck supported toward the rear by ground engaging wheels, mating surfaces on the gooseneck and the deck which abut against each other when the gooseneck is attached to the deck, coupling pins extending along spaced apart, parallel axes from the gooseneck and the deck on opposite sides of the abutting surfaces, a coupling link slidably mounted on the pin on the gooseneck with a socket for receiving the pin on the deck when the link is in a first position, a bar spaced from and affixed to one side of the coupling link, an operating arm mounted on the gooseneck for movement about a pivot axis perpendicular to the axes of the coupling pins, with a first end portion of the operating arm extending in a direction generally parallel to the pivot axis and passing between the one side of the coupling link and the bar, and an actuator connected to a second end portion of the operating arm for rotating the arm about the pivot axis and swinging the first end portion of the arm toward the bar to move the coupling link to a second position in which the link is disengaged from the pin on the deck.

19. The trailer of claim 18 including a spring connected between the gooseneck and the second end portion of the operating arm for urging the arm to rotate in a direction opposite the to actuator, with the first end portion of the arm being urged toward the one side of the coupling link and the link thereby being urged toward the first position.

20. The trailer of claim 18 wherein the mating surfaces are forwardly and downwardly inclined, and the coupling pins extend longitudinally of the gooseneck and deck.

21. The trailer of claim 18 wherein the actuator is a pneumatic cylinder.

* * * * *